United States Patent

[11] 3,554,079

| [72] | Inventors | Ernst J. Hunkeler<br>Fairport;<br>John L. Ash, Pittsford; Myron F. DeWolf,<br>Penfield, N.Y. |
|---|---|---|
| [21] | Appl. No. | 764,216 |
| [22] | Filed | Oct. 1, 1968 |
| [45] | Patented | Jan. 12, 1971 |
| [73] | Assignee | The Gleason Works, Rochester, N.Y., a corporation of New York |

[54] CHAMFERING MEANS
36 Claims, 13 Drawing Figs.

[52] U.S. Cl. .................................................. 90/1.4, 90/1
[51] Int. Cl. .................................................. B23f 19/10
[50] Field of Search .................................. 90/1.4, 5, 6, 1.6, 1, 3, 9.4

[56] References Cited
UNITED STATES PATENTS

| 2,504,578 | 4/1950 | Pelphrey | 90/1.6 |
| 2,898,813 | 8/1959 | Carlsen et al. | 90/1.4 |
| 3,169,446 | 2/1965 | Anderson et al. | 90/1 |
| 3,177,773 | 4/1965 | Kehr et al. | 90/1.4 |
| 3,286,593 | 11/1966 | Bibbens | 90/1.4 |
| 3,368,455 | 2/1968 | Ellwanger | 90/1 |

FOREIGN PATENTS

| 1,030,082 | 5/1966 | Great Britain | 90/1.4 |

*Primary Examiner*—Gil Weidenfeld
*Attorney*—Cushman, Darby & Cushman and Morton A. Polster

ABSTRACT: An automatic electrohydraulic chamfering unit, which can be operated with a conveyor means or incorporated into an automated gear-generating machine, comprises upper and lower centering and clamping assemblies for retaining a workpiece therebetween, upper and lower chamfering assemblies for chamfering the tooth edges at the toe and heel of each tooth, an indexing assembly for successively aligning each tooth of the workpiece with the chamfering tools and an automatic control system which governs the operating sequence of the above components during the chamfering cycle. The upper and lower centering and clamping assemblies are actuated by the control system to permit rotational movement of a workpiece during the indexing portion of the chamfering cycle and to firmly lock a workpiece in a fixed position during the chamfering portion of the cycle. The upper and lower chamfering assemblies are mounted on the chamfering unit so that the chamfering assemblies can be independently adjusted relative to the centering and clamping assemblies along the three major axes and about one of the axes for locating the chamfering assemblies relative to the workpiece. The indexing assembly through the reciprocating movement of a spring-biased finger which is received between the workpiece teeth indexes a workpiece by movement of the finger parallel to the axis of rotation of the workpiece. Scales are provided on the indexing assembly, the chamfering assemblies and mountings to facilitate initial and subsequent adjustments of the various components of the chamfering unit.

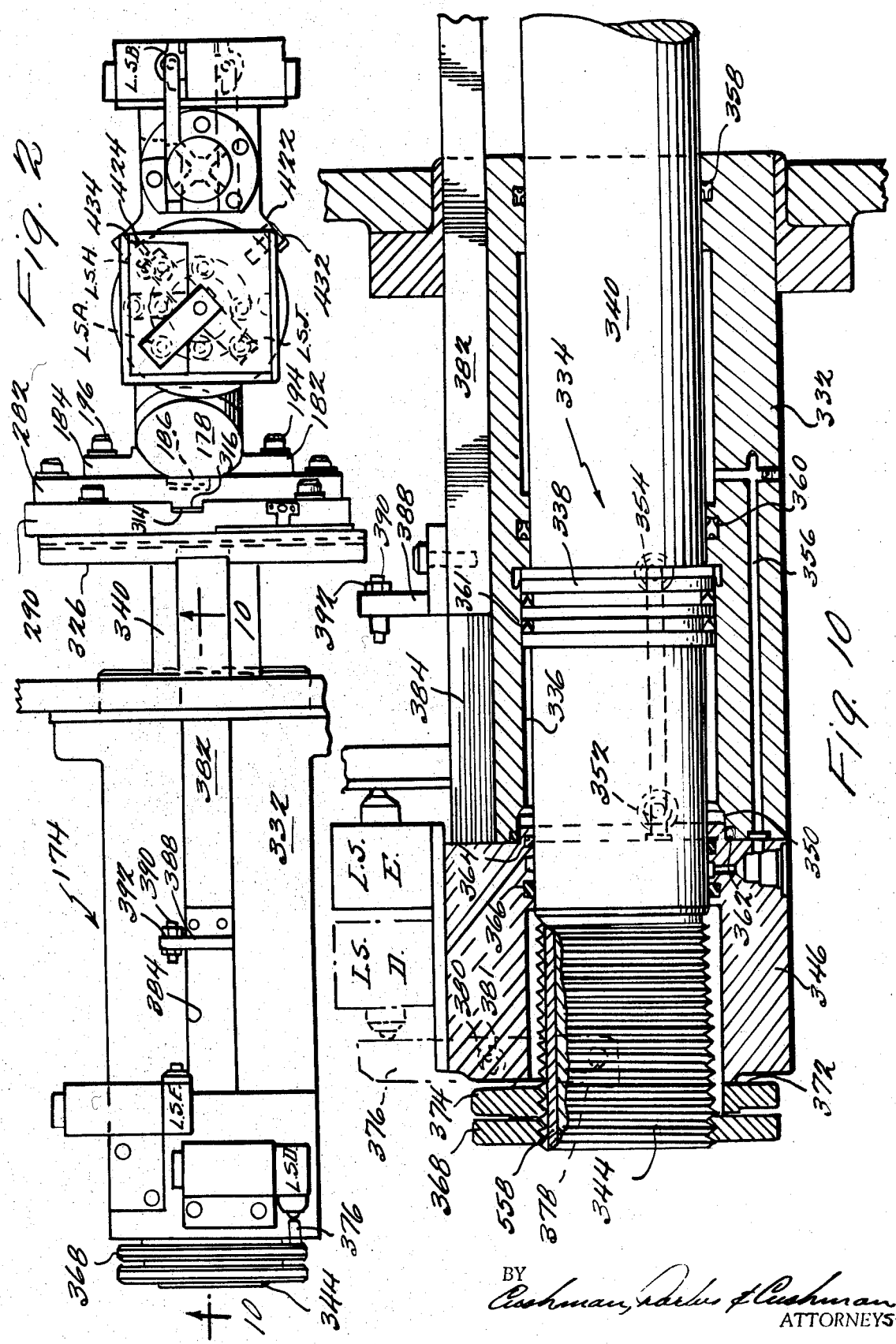

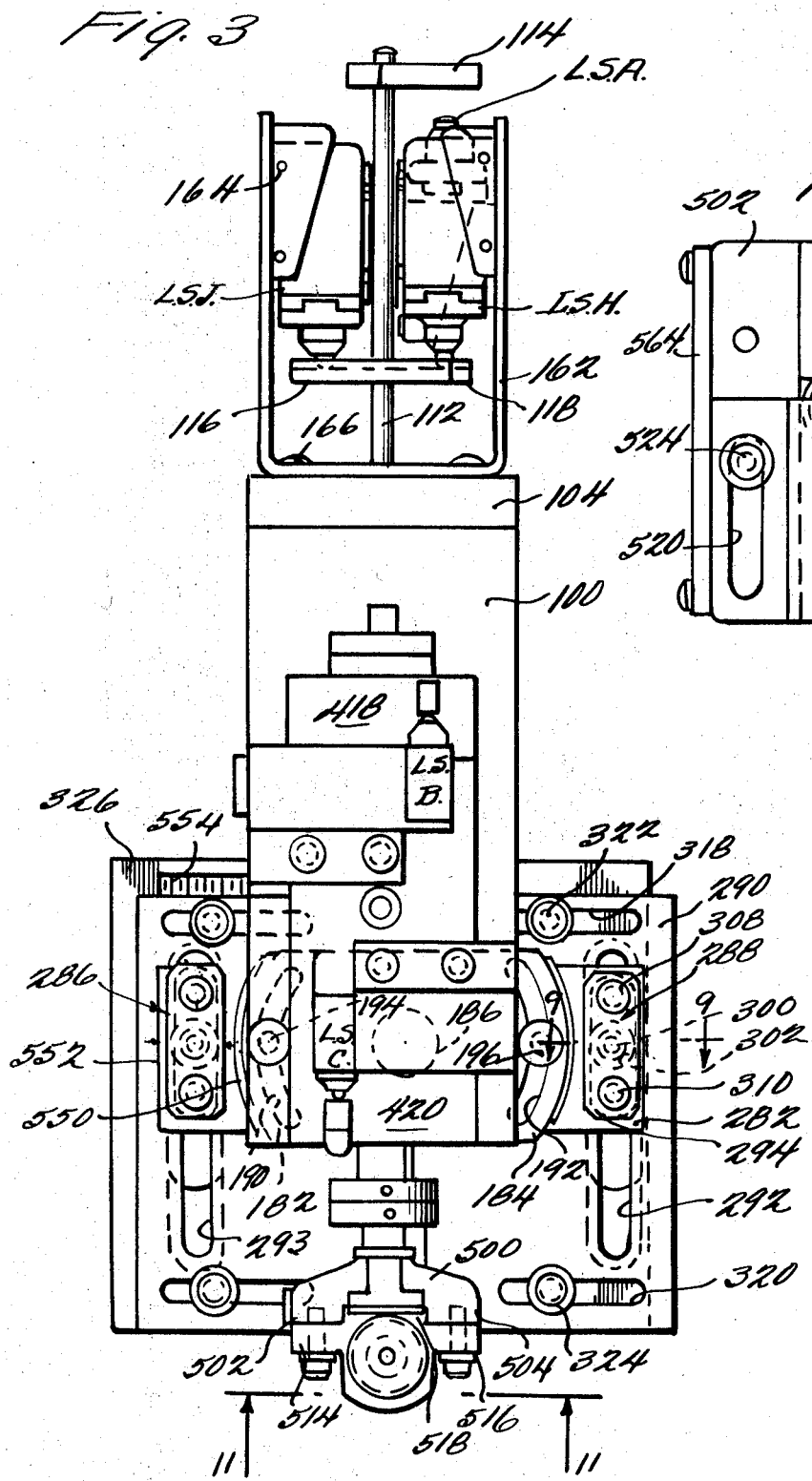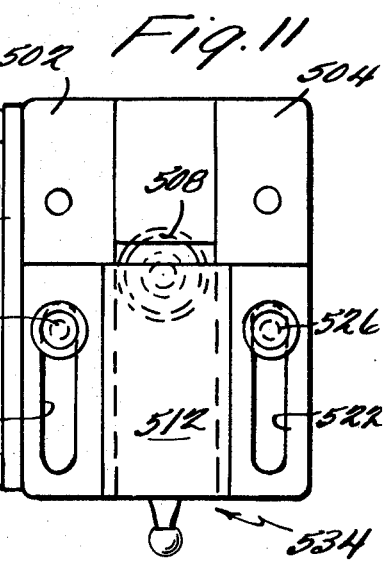

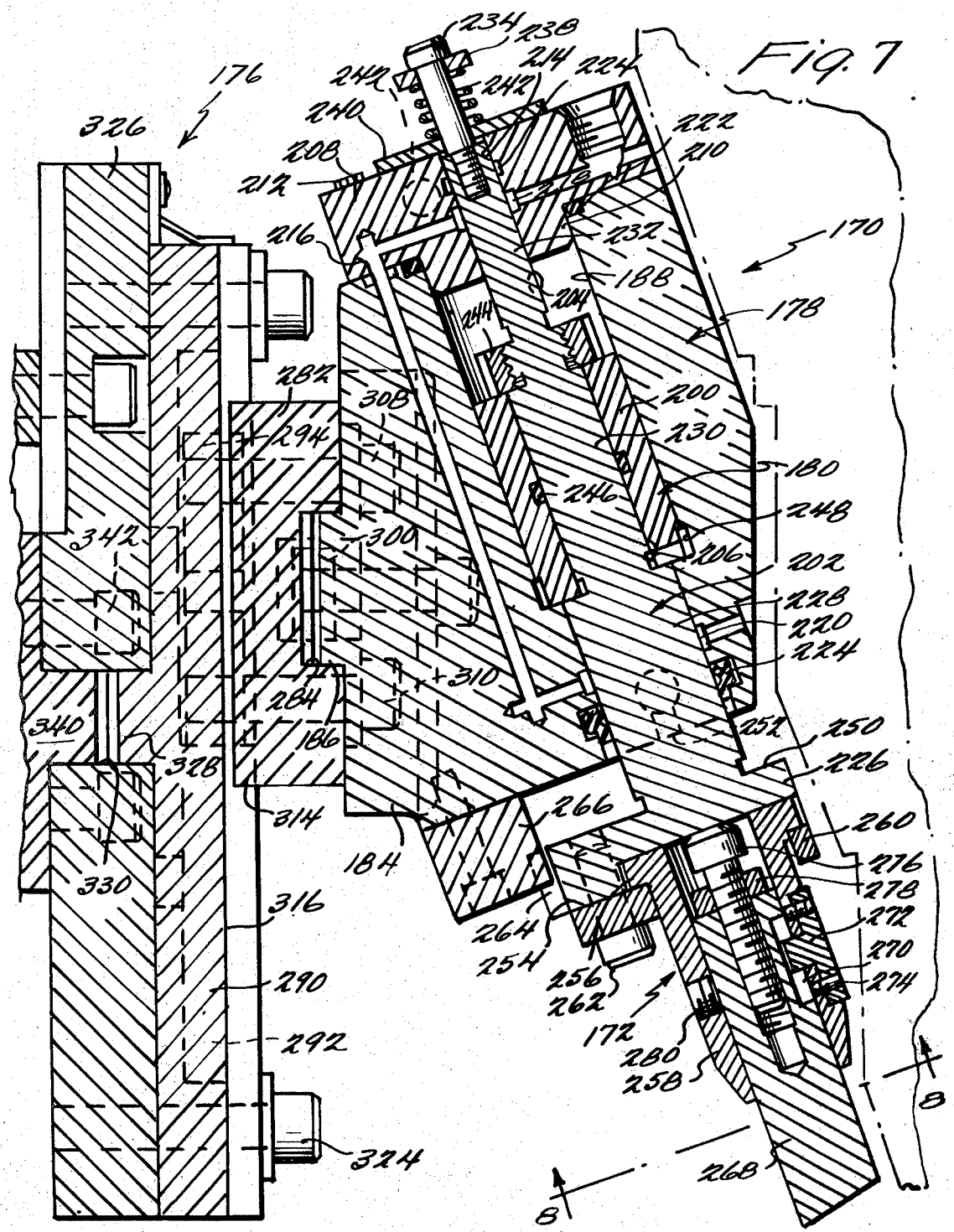

CHAMFERING MEANS

BRIEF DESCRIPTION OF THE INVENTION

The present invention relates to an improved chamfering unit for chamfering pinions and similar workpieces, especially spiral bevel and hypoid pinion gears.

The present invention is part of an overall, general development of the Gleason Works which includes several inventions besides that disclosed and claimed herein. This development includes other inventions such as a novel structural orientation of center parts, a novel cradle housing and cradle assembly, a novel ratio control or ratio change mechanism, novel control means for the generating train, a novel workhead assembly, novel means for conveying gears or gear blanks to the cutting stations and transferring them between cutting stations with novel means for automatic stock division in going from one station to the other, a novel control means for controlling the operation of the work loading and unloading and automatic stock division mechanisms, novel cutter-truing techniques and structures, and other novel structures and techniques, all of which are being covered in a series of patent applications. These applications are: Ser. Nos. 764,212; 764,213; 764,214; 764,221; 764,222; 764,217; 764,218; 764,219; 764,220; 764,215; and 764,223, filed contemporaneously herewith, and the disclosures of which are all incorporated herein by reference.

One object of the present invention is to provide an improved work-centering and clamping assembly which will firmly retain a workpiece in proper alignment with the chamfering tools during the chamfering portion of an operating cycle.

Another object of the invention is to provide an electrohydraulic chamfering unit which will operate more efficiently to lessen the amount of tool breakage, maintenance and other difficulties encountered with the use of electromechanical chamfering machines.

In chamfering units of the prior art, such as the unit disclosed in the patent to Carlsen et al., U.S. Pat. No. 2,898,813, issued Aug. 11, 1959, the heel tools chamfer out of the slot rather than into the slot leaving burrs where they cannot be readily removed during subsequent finishing operations. Therefore, another object of the invention is to provide a chamfering unit having a heel tool which chamfers into a slot rather than out of a slot whereby any burrs formed due to the use of dull tools are left where they can be readily removed by the finishing operation.

A still further object of the invention is to provide a chamfering unit having scales on the various components to facilitate the initial and any subsequent adjustments of the unit.

A still further object of the invention is to provide an improved indexing assembly which assures proper alignment of the workpiece teeth with the chamfering tools through the use of a reciprocating spring-biased finger which cooperates with the teeth of the workpiece to rotate the workpiece during the time intervals between the cutting strokes of the chamfering tools. The indexing assembly of the present invention thereby eliminates the need for special indexing plates such as those required in indexing assemblies of the prior art (see plate 189 of the Carlsen et al. U.S. Pat. No. 2,898,813, issued Aug. 11, 1959) while assuring accurate alignment of the workpiece teeth with the chamfering tools.

A still further object of the invention is to provide a chamfering unit and an automatic control system for the unit that can be incorporated into a completely automated gear-generating machine.

Briefly, the chamfering unit comprises a pair of opposed workpiece-centering and clamping assemblies, a pair of chamfering assemblies for chamfering the teeth of the workpiece, an indexing assembly with a spring-biased finger which cooperates with the teeth of the workpiece to properly align the teeth with respect to the chamfering assemblies, and a control system for automatically performing the chamfering operation from beginning to end which can be independently actuated or incorporated into the control system of a pinion machine, to be actuated upon a signal from the master control system of the pinion machine. The chamfering machine is electrohydraulically controlled and operated.

The lower workpiece-centering and clamping assembly has a spring and hydraulically actuated piston with a pilot element mounted on its upper free end for engaging the workpiece. The piston and pilot element on the lower assembly are normally held in a retracted position against the pressure of the spring by hydraulic pressure applied to the upper side of the piston.

The upper workpiece-centering and clamping assembly comprises a pilot rod which is spring-biased downwardly by a pair of coil springs, one of the coil springs exerting pressure against the pilot only after there has been a predetermined upward movement of the pilot rod. With this construction, when the upper side of the piston in the lower workpiece-centering and clamping assembly is exhausted, the coil spring within the lower assembly causes the piston to be extended until the workpiece is rotatably held between the pilots of the upper and lower assemblies. The upward movement of the pilots is arrested by the second spring element in the upper assembly which along with the first spring element in the upper assembly exerts a downward force on the pilots greater than the force of the coil spring in the lower workpiece-centering and clamping assembly. To permit indexing of the workpiece, the second spring is arranged so as to arrest the upward movement of the workpiece prior to the engagement of the workpiece by the upper pilot housing which has a surface adapted to prevent rotation of the workpiece relative to the centering and clamping assemblies during the cutting strokes of the chamfering tools.

To clamp the workpiece in place for a cutting stroke of the chamfering tool, pressure is applied to the underside of the piston in the lower centering and clamping assembly thereby overcoming the combined forces the two springs in the upper assembly and causing the workpiece to move up into engagement with the upper pilot housing. The added pressure exerted on the workpiece and the lower surface of the upper pilot housing firmly clamp the workpiece in place for the chamfering operation.

The pair of chamfering assemblies each comprise hydraulic piston and cylinder assemblies with chamfering tools mounted thereon for chamfering the edges at the toe and heel of each tooth. The chamfering assemblies are carried on reciprocating tool mounts to effect withdrawal of the chamfering assemblies while a new workpiece is being brought into position and to extend the assemblies to an operative position adjacent to the workpiece-centering and clamping assemblies after the workpiece is in place between the centering and clamping assemblies. The chamfering assemblies are mounted on the reciprocating mounts by means of brackets which permit vertical and horizontal adjustment of the chamfering assemblies with respect to the mount and the workpiece-centering and holding assemblies and which permit angular adjustment of the chamfering assemblies about an axis parallel to the longitudinal axis of the reciprocating mount whereby the chamfering assemblies can be adjusted along the three major axes and rotated about one of the major axes, to properly position the tools relative to the workpiece being chamfered. The reciprocating mounts, brackets and the chamfering tools are all provided with scales to facilitate the initial adjustment of the chamfering unit and any subsequent adjustments which have to be made to the unit.

The indexing assembly comprises a spring-biased finger which is carried on the free end of a reciprocating piston shaft which reciprocates on an axis parallel to the axis of the upper and lower workpiece-centering and clamping assemblies. The finger is biased into the slots formed between the teeth of the workpiece so that movement of the finger parallel to the longitudinal axis of the workpiece, when the workpiece is not clamped between the centers, will rotate and properly position the teeth of the workpiece relative to the chamfering tools. After the workpiece has been properly positioned and clamped in place for the chamfering of a particular tooth, the spring-biased finger is retracted to its initial position to reset the indexing assembly for the next indexing stroke. Since the workpiece is firmly clamped in place, the finger slides over the teeth without causing any movement of the workpiece. The indexing assembly is provided with means for controlling the length of the piston stroke by adjusting the upper and lower limits of the stroke so that the assembly can be adjusted to meet the requirements of different indexing operations. In addition, the spring-biased finger can be adjusted radially and axially with respect to the axis of rotation of workpiece to the setting desired for a particular operation. The piston and finger adjustment means are both provided with scales to facilitate the initial and any subsequent adjustment of the indexing assembly.

When the electrohydraulic control system of the chamfering unit is actuated, the following chamfering cycle is initiated. The piston in the lower workpiece-centering and clamping assembly is extended whereby a workpiece is rotatably secured between the upper and lower pilots of the workpiece-centering and clamping assemblies. The mounting of the workpiece between the centering and clamping assembly causes the extension of the reciprocating chamfering assembly mounts to position the chamfering assemblies adjacent the workpiece-centering and clamping assemblies. When the chamfering assemblies have been properly positioned relative to the workpiece-centering and clamping assemblies, the indexing assembly is actuated to properly align the workpiece for the chamfering of the first tooth. After the workpiece has been indexed for the first cutting or chamfering stroke, the piston in the lower centering and clamping assemblies is further elevated to thereby firmly clamp the workpiece between the centering and clamping assemblies so that there will be no movement of the workpiece during the cutting strokes of the chamfering assemblies. The clamping of the workpiece in place actuates the chamfering assemblies for the chamfering stroke and also allows the index assembly to reset for the next indexing operation while the workpiece is still firmly clamped in position so that the finger of the indexing assembly will slide over the teeth of the workpiece without causing any rotational movement of the workpiece. At the completion of the cutting stroke, the chamfering assemblies are reset for the next chamfering stroke. When the chamfering tool is reset for the next chamfering stroke, a tooth counter is actuated which either causes the workpiece-centering and clamping assemblies to unclamp the workpiece and initiates an indexing cycle to bring the next tooth into position for the following chamfering stroke or after the last tooth has been chamfered, retracts the chamfering assemblies to their inoperative position. With the retraction of the chamfering assemblies to their inoperative position, the workpiece-centering and clamping assemblies are actuated to release the workpiece or lower the workpiece onto a conveyor. The conveyor is actuated so that it indexes a new workpiece into place between the pilots of the upper and lower workpiece-centering and clamping assemblies and the chamfering cycle can be repeated.

The above objects and advantages of the present invention will become more apparent and other objects and advantages of the present invention will become apparent from the following detailed description when taken in conjunction with the accompanying drawings in which:

FIG. 2 is a top plan view of the chamfering unit;

FIG. 3 is an end view taken substantially along lines 3–3 of FIG. 1 and showing the upper workpiece centering and clamping assembly, the indexing assembly and the brackets for mounting the upper chamfering assembly to the reciprocating mount;

FIG. 7 is an enlarged sectional view of the upper chamfering assembly during the chamfering stroke;

FIG. 10 is an enlarged sectional view of the upper reciprocating chamfering assembly, with the mounts extended, taken substantially along lines 10–10 of FIG. 2;

FIG. 11 is a bottom plan view of the workpiece indexing element taken substantially along lines 11–11 of FIG. 3;

DETAILED DESCRIPTION OF THE INVENTION

Figure 1:
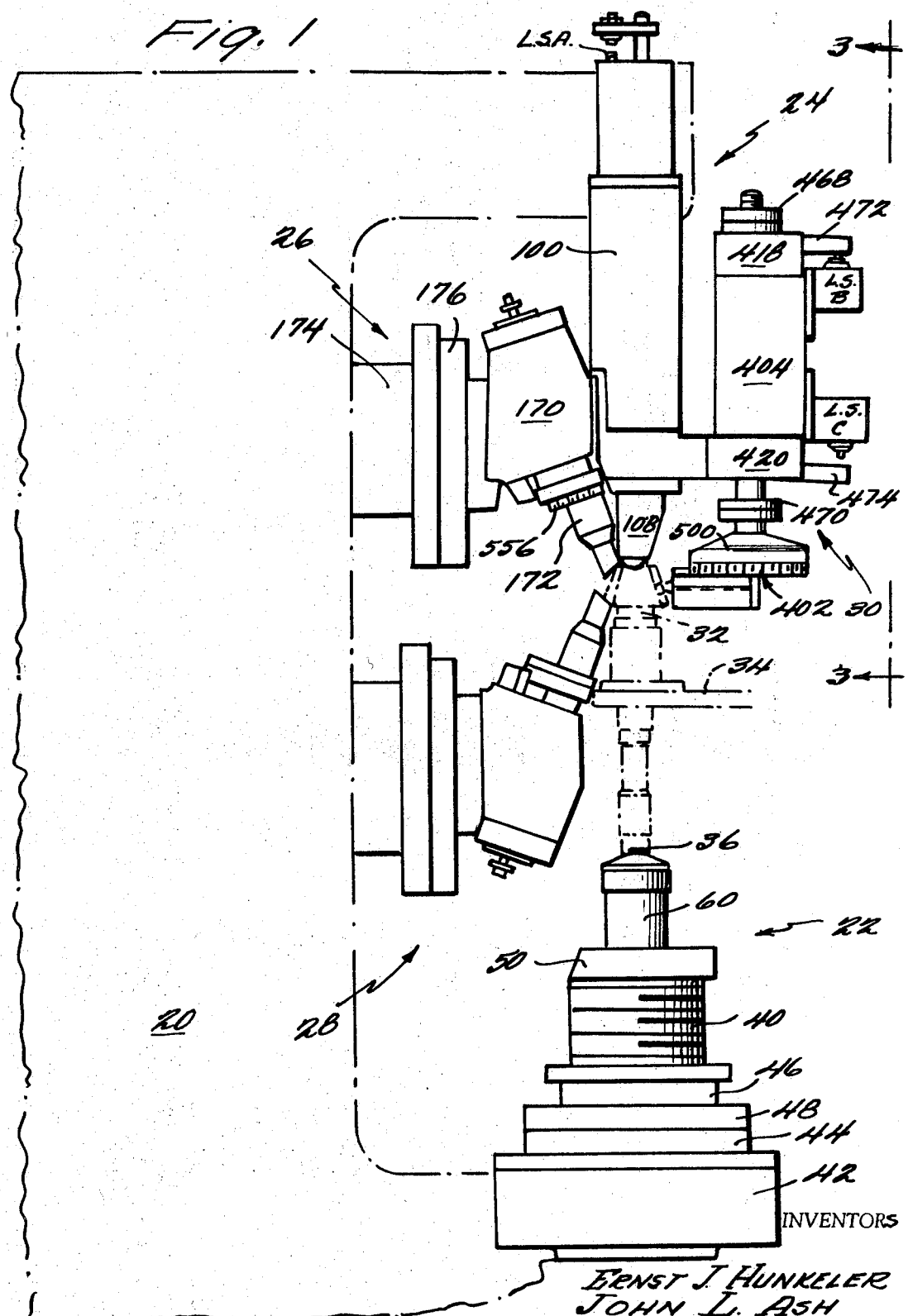
FIG. 1 is a side elevational view of the chamfering unit during the chamfering strokes of the chamfering assemblies, with the workpiece clamped in place and the indexing assembly ready to reset.

Referring now to the drawings and, in particular to FIG. 1, the chamfering unit is designated by reference numeral 20. The chamfering unit comprises a lower workpiece-centering and clamping assembly 22, an upper workpiece-centering and clamping assembly 24, an upper or toe chamfering assembly 26, a lower or heel-chamfering assembly 28 and an indexing assembly 30. While the chamfering unit can be used to chamfer other toothed workpieces, the chamfering unit is especially adapted to chamfer spiral bevel or hypoid pinion gears 32 which can either be manually positioned between the workpiece centers or positioned between the workpiece centers by means of a conveyor system 34 when the chamfering unit is incorporated into an automated gear-generating machine such as the 615 Pinion Machine of Gleason Works.

Figure 4:
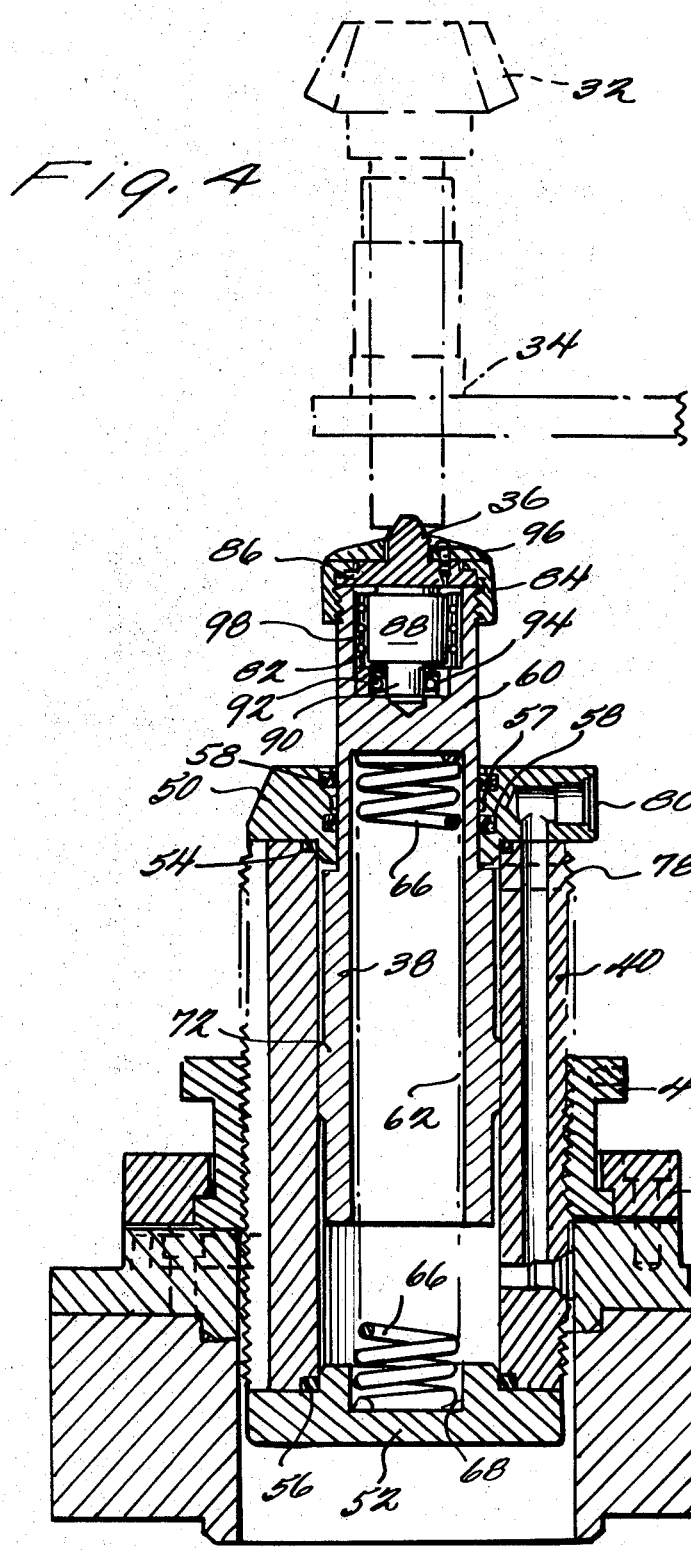
FIG. 4 is an enlarged sectional view of the lower workpiece-centering and clamping assembly with the piston of the assembly extended as in FIG. 1.

In the lower workpiece-centering and clamping assembly 22, the pilot rod 36 is carried on the shaft of a piston 38 (see FIG. 4) that is slidably carried within cylinder 40. Cylinder 40 has a threaded exterior surface which is received within a vertical bore extending through mounting frame 42, which in turn is affixed to a suitable foundation or bolted to the frame of a gear-generating machine. A retaining plate 44 with a threaded bore is bolted to the upper face of mounting frame 42. To lock the cylinder 40 in place after it has been threaded into the bore of retaining plate 44, an internally threaded locking collar 46 is provided which cooperates with an outer collar 48 bolted to plate 44 and the threaded bore of plate 44 to firmly lock the cylinder 40 against rotation. As shown in FIG. 4, the upper end of cylinder 40 is closed by an end cap 50 and the lower end of the cylinder is closed by end cap 52 both of which are secured to the cylinder 40 by bolt assemblies or similar fastening means. As shown O-rings 54 and 56 are provided to prevent the leakage of hydraulic fluid through the joints formed between the end caps and cylinder 40.

End cap 50 has an aperture extending therethrough which is provided with a fluid bearing 57 and a pair of annular seals 58 that engage the outer surface of piston shaft 60 to prevent the seepage of hydraulic fluid or lubricant from the cylinder. Piston 38 is slidably retained within cylinder 40 and has a longitudinally extending bore 62 therein which extends from the underside of the piston up into the shaft 60 of the piston. Bore 62 houses an upper portion of coil spring 66 which extends between the upper end wall of bore 62 and the end wall of a cylindrical depression 68 in the boss of cap 52 thereby urging the piston upward relative to the cylinder 40.

Cylinder 40 is divided into upper and lower chambers by peripheral flange 72 of piston 38 which is intermediate the upper and lower annular surfaces of the piston. Flange 72 engages the bore of cylinder 40 and prevents the seepage of hydraulic fluid between the upper and lower chambers. The upper and lower chambers are each provided with inlet-exhaust ports 78 and 80, respectively, which communicate with a source of pressurized hydraulic fluid and an exhaust reservoir (not shown) through a control system which will be more fully explained hereinafter. Through these ports, pressurized hydraulic fluid can be supplied to and exhausted from the chambers to elevate and retract the piston shaft 60 during the chamfering cycle.

Shaft 60 of piston 38 has a centering or pilot rod 36 mounted thereon, a lower portion of which is retained in a bore 82 of shaft 60 by means of an internally threaded collar 84 which is threaded onto the upper end of shaft 60. Pilot 36 has an upper portion with an annular flange 86, an intermediate bearing mounting portion 88 and a lower extension 90. An annular leaf spring 92 is retained about the lower extension 90 of the pilot to urge the pilot upward and offset the downward force exerted by the workpiece during indexing so that the pilot is free to rotate. The spring 92 is interposed between a shoulder formed between extension 90 and intermediate portion 88 and a roller bearing 94 which rests on the bottom of bore 82. The vertical movement of pilot 36 is restricted by flange 86, a collar 96 which is secured to the pilot 36 and the internal flange of collar 84 that is interposed between flange 86 and collar 96. In this way, the vertical movement of the pilot 36 relative to shaft 60 is limited by the spacing between the upper face of flange 86 and collar 96 relative to the width of the internal flange on collar 84. The relative rotation between pilot 36 and piston 60 during an indexing operation is facilitated by the bearing assembly 98 which is carried on portion 88 of the pilot and is interposed between the pilot and the sidewall of bore 82.

Figure 5:
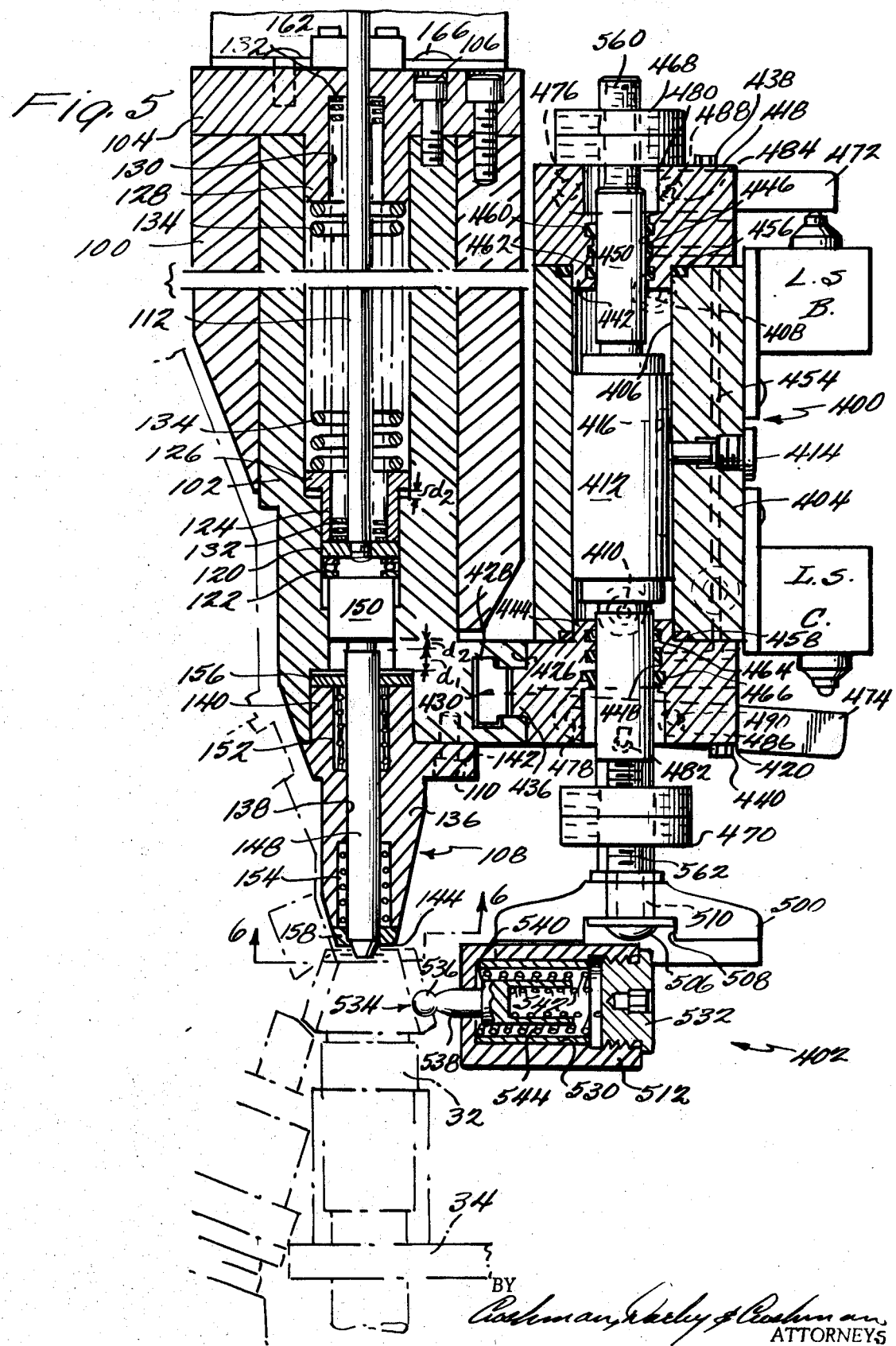
FIG. 5 is an enlarged sectional view of the upper workpiece-centering and clamping assembly with a workpiece clamped in place and of the index assembly which is ready to reset.

Referring to FIG. 5, the upper workpiece-centering and clamping assembly 24 is mounted within a sleeve 100 of the chamfering unit frame. The upper workpiece-centering and clamping assembly 24 comprises an elongated cylindrical sleeve 102 having an upper end closure 104 secured by bolt assemblies 106 or similar fastening means to the upper end thereof and a pilot assembly 108 secured by bolt assemblies 110 or equivalent fastening means to the lower end thereof.

Sleeve 102 is of varying internal diameter having upper and lower end portions of substantially equal diameter interconnected by upper and lower intermediate portions of lesser diameters with the upper intermediate portion of the sleeve having a larger internal diameter than the lower intermediate portion. A rod element 112 is carried within the sleeve and extends from the upper intermediate portion of the sleeve through the upper portion of the sleeve and beyond the upper end closure 104. Rod element 112 has adjustable actuating elements 114, 116 and 118 thereon adjacent the upper end thereof for actuating limit switches A, J and H of the chamfering unit as will be more fully explained hereinafter.

The lower end of the rod is threaded into a collar 120 which has a diameter substantially equal to but less than the internal diameter of the upper intermediate portion of cylinder 102 whereby the collar 120 is slidably carried within the upper intermediate portion of cylinder 102. Collar 120 normally engages an annular roller bearing 122 which is interposed between the collar 120 and the shoulder formed between the upper intermediate portion of the cylinder 102 and the lower intermediate portion of cylinder 102. With this arrangement, the downward movement of collar 120 and, consequently, rod 112 is arrested by the contact of roller bearing 122 with the shoulder formed between the intermediate portions of sleeve 102.

A sleeve 124 is housed within the upper intermediate portion and the upper portion of sleeve 102. Sleeve 124 has a diameter substantially equal to but less than the diameter of the upper intermediate portion whereby the sleeve is slidably received within the upper intermediate portion of cylinder 102. An annular peripheral flange 126 at the upper end of collar 124 has an outer diameter substantially equal to but less than the internal diameter of the upper portion of sleeve 102 with the flange being slidably received within the upper portion of sleeve 102. The lower annular surface of flange 126 cooperates with the shoulder formed between the uppermost portion of sleeve 102 and the upper intermediate portion of sleeve 102 to limit the downward movement of sleeve 124. The length of sleeve 124 intermediate the lower annular surface of flange 126 and the lower end of the sleeve is such that collar 120 must move vertically upward a certain distance $d_1$ from its lowermost position before contact is made between the lower edge of sleeve 124 and the upper surface of collar 120.

Cap element 104 is substantially circular in configuration and has a depending, centrally located boss 128 having an external diameter substantially equal to but less than the internal diameter of the uppermost portion of sleeve 102 whereby the boss 128 is slidably received within the upper portion of sleeve 102. The end closure 104 has a central aperture 130 passing therethrough from the underside of the boss 128 and to the upper surface thereof. The aperture is of varying diameter with the uppermost portion having substantially the same diameter as rod 112 wherein the rod is slidably received within the uppermost portion of the aperture. The lowermost portion of aperture 130 has a greater internal diameter whereby the upper end of a coil spring 132 can be carried within the aperture about rod 112.

Coil spring 132 abuts the shoulder formed between the uppermost and lower portions of aperture 130 at one end and at the other end abuts the upper surface of collar 120 thereby normally biasing collar 120 downward until spacer 122 contacts the shoulder formed between the intermediate portions of sleeve 102. A second coil spring 134 is housed within the upper portion of sleeve 102 and extends between the lower surface of boss 128 and the upper surface of flange 126 of sleeve 124 thereby biasing sleeve 124 downward so that flange 126 normally engages the shoulder between the uppermost portion and the upper intermediate portion of sleeve 102.

Due to the concentric springs and the spacing which normally exists between the upper surface of collar 120 and the lower surface of sleeve 124 when they are in their lowermost positions, it can be seen that the initial upward movement of collar 120 compresses only the innermost spring 132 until the upper surface of collar 120 contacts the lowermost surface of sleeve 124. At this point, any further upward movement, $d_2$, of collar 120 and sleeve 124 causes the compression of both the inner and outer concentric springs within the upper workpiece-centering and clamping assembly 24. As will be more fully explained hereinafter, the interaction of these springs with collar 120 and sleeve 124 is instrumental in the retaining of a workpiece between the pilot elements of the upper and lower workpiece-centering and clamping assemblies during the indexing and chamfering portions of the work cycle wherein the workpiece is, respectively, rotatably held and clamped between the upper and lower assemblies.

Pilot assembly 108 which, has a housing 136 that is secured to the lower end of sleeve 102 by bolt assemblies 110 or similar fastening means, varies in construction according to the particular requirements of the chamfering operation. For instance, in the chamfering of pinion gears for automobiles, the pilot assembly would be modified as necessary to fit the particular requirements of the pinion gear being chamfered. However, for the purposes of illustrating a preferred form of the invention, the pilot assembly illustrated in FIG. 5 is typical of the pilot assembly to be used and the modifications necessary to adapt the pilot assembly for various workpieces would be obvious to one of ordinary skill in the art.

Figure 6:
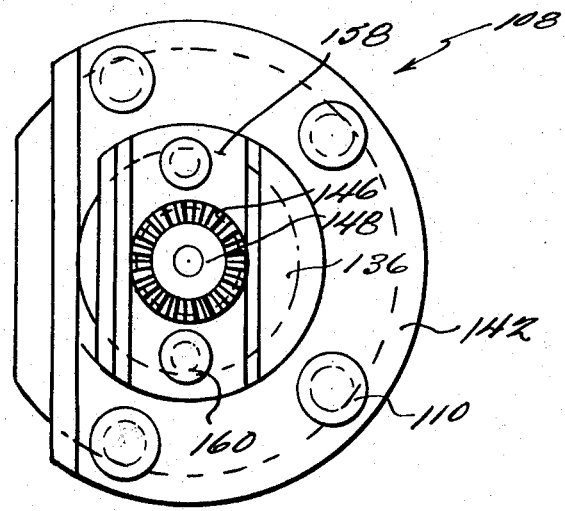
FIG. 6 is a plan view of the underside of the upper pilot housing taken substantially along lines 6–6 of FIG. 5.
Figure 8:
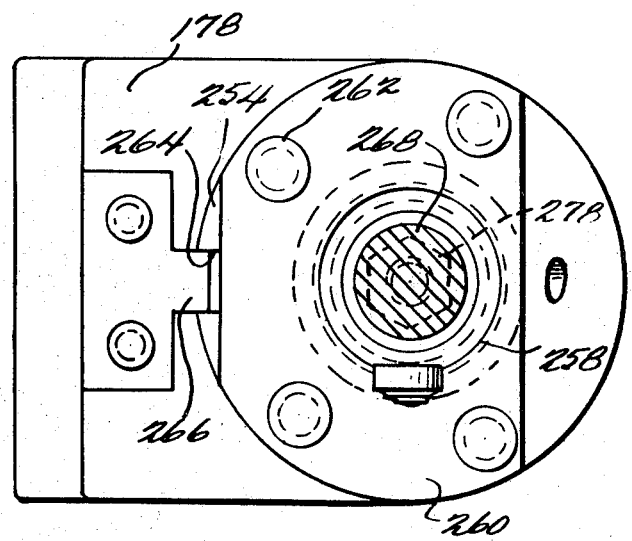
FIG. 8 is a plan view of the lower end of the chamfering assembly taken substantially along lines 8–8 of FIG. 7.

Pilot assembly 108 comprises a sleevelike housing 136 having a waisted aperture 138 extending therethrough and an external surface which is contoured to permit the upper chamfering assembly 26 to be brought into position for the chamfering of a workpiece held between the upper and lower centering and clamping assemblies. The uppermost portion of housing 136 has a cylindrical portion 140 which is slidably received within the lowermost portion of sleeve 102. A peripheral flange 142 extends partway around the midportion of pilot housing 136 and is provided with apertures therein through which bolt assemblies 110 extend to rigidly affix the pilot assembly to the lower end of sleeve 102. As can be seen in FIG. 5, the side of pilot housing 136 adjacent the chamfering assembly is cut away to permit the chamfering assembly to be positioned adjacent the workpiece. The lower end face 144 of the pilot housing 136 has radial serrations 146, as shown in FIG. 6, to help retain a workpiece against rotation when a workpiece is clamped between the upper and lower workpiece-centering and clamping assemblies.

Pilot rod 148, which has substantially the same external diameter as the waisted midportion of the aperture 138 passing through the pilot housing, extends entirely through the housing of the assembly and beyond the upper and lower ends of the assembly. The lowermost portion of the pilot rod has a tapered frustoconical surface adapted to be received in a complementary depression within the workpiece for properly centering the workpiece relative to the chamfering tools. The uppermost portion of rod 148 has an enlarged head portion 150 with a diameter substantially equal to but less than the diameter of the lower intermediate portion of sleeve 102 with the head portion being slidably received within the lower intermediate portion of sleeve 102. The upper and lower portions of aperture 138 are provided with bearing assemblies 152, 154 which facilitate both the rotation and vertical movement of pilot rod 148 relative to the housing of the pilot assembly during the indexing and clamping or unclamping of a workpiece. The bearing assemblies 152, 154 are maintained in aperture 138 by annular end plate 156 which is affixed to the upper end of pilot housing 136 and the lower notched end plate 158 which is affixed in a like manner to the underside of pilot housing 136 by bolt assemblies 160.

As can be readily seen from FIG. 5, upward movement of pilot rod 148 causes the head portion 150 of the pilot rod to engage the bearing 122 which is interposed between the lower surface of collar 120 and the shoulder formed between the intermediate portions of sleeve 102. As the pilot rod 148 moves vertically upward during the initial contact between a workpiece 32 and the pilot rod, the pilot rod, through its engagement with bearing 122, causes the upward movement, $d_1$, of collar 120 and the compression of spring 132. Since the combined downward forces of springs 132 and 134 is greater than the upward force of spring 66, the upward movement of collar 120 and the pilot rod 148 is limited by the contact of collar 120 with the underside of sleeve 124 and the workpiece 32 is rotatably maintained between the centering and clamping assemblies 22, 24 under a limited amount of pressure. When the underside of piston 28 in the workpiece-centering and clamping assembly is pressured, the upward force exerted on the workpiece 32 by the lower centering and clamping assembly 22 overcomes the combined force of springs 132, 134 in the upper assembly whereby the workpiece is moved upward a distance, $d_2$, into contact with the notched surface of the upper pilot housing thereby firmly clamping the workpiece in place and preventing any rotation of the workpiece relative to the centering and clamping assemblies.

Limit switches A, J and H are mounted on the upper end closure 104 by a bracket 162 with the limit switches being retained on the bracket by bolt assemblies 164 and the bracket being secured to the upper end closure 104 by bolt assemblies 166. Limit switch A faces upward and is normally contacted by actuating element 114 between chamfering cycles to complete a control circuit of the gear-generating machine which advances the workpiece conveyor. The initial upward movement of rod 112 disengages element 114 and limit switch A thereby preventing any conveyor advance until the chamfering cycle is completed.

Limit switches J and H both face downward and are actuated by actuating elements 116 and 118 respectively. Elements 116 and 118 are adjusted so that limit switch J is actuated during the initial upward movement of rod 112 to cause the chamfering assemblies to be extended and limit switch H is actuated when the workpiece has been clamped in place to initiate the chamfering stroke of the chamfering assemblies and the resetting of index assembly 30.

The upper and lower chamfering assemblies 26 and 28 are identical in operation and structure. Therefore, it is to be understood that the following detailed description of the upper chamfering assembly 26 applies also to the lower chamfering assembly 28 with the detailed description of the lower chamfering assembly being omitted to prevent unnecessary repetition.

Referring now to FIG. 1, chamfering assembly 26 comprises a hydraulic piston and cylinder assembly 170, chamfering tool assembly 172, reciprocating tool mount 174 and mounting bracket assembly 176 for securing hydraulic piston and cylinder assembly 170 to reciprocating tool mount 174. As shown in FIG. 7, hydraulic piston and cylinder assembly 170 comprises a cylinder 178 and a piston assembly 180 which carries chamfering tool assembly 172.

The outer surface of cylinder 178 is contoured to permit the piston and cylinder assembly 170 to be brought into proximity with the upper workpiece-centering and clamping assembly 24 so that the chamfering assembly can be properly positioned adjacent the upper workpiece-centering and holding assembly for the chamfering cycle. In addition, the cylinder 178 is provided with a pair of lateral flanges 182, 184 and a cylindrical boss 186 on the side farthest from the workpiece-centering and clamping assembly which form part of mounting bracket assembly 176. The axial center line of the boss extends horizontally and intersects the longitudinal center line of the cylinder bore 188 whereby rotation of piston and cylinder assembly 170 about the axis of boss 186 angularly positions the assembly relative to a horizontal axis for the purpose of adjusting the chamfering assembly for a chamfering cycle. Flanges 182, 184 have arcuate slots 190, 192 therein with centers of curvature coinciding with the central axis of boss 186. The slots cooperate with bolt assemblies 194, 196 which are anchored in bracket assembly 176 to lock the piston and cylinder assembly 170 in the desired angular position after it has been rotated about the axis of boss 186.

The bore 188 of cylinder 178 is of varying internal diameter having an upper enlarged portion, which houses piston sleeve 200, and a reduced lower portion which houses a portion of piston shaft 202 of the piston assembly. In addition, the upper portion of the cylinder bore 188 is provided with a pair of inlet-exhaust ports 204, 206, which supply and exhaust hydraulic fluid from opposite sides of piston sleeve 200 during the operation of the chamfering tool, to reciprocate the piston assembly 180 relative to cylinder 178.

The upper end of bore 188 is closed by an end cap 208 having a boss 210 thereon with an external diameter substantially equal to but less than the internal diameter of bore 188 whereby the boss is slidably received within bore 188. The end cap 208 is secured to the cylinder 178 by bolt assembly 212 or equivalent fastening means. End cap 208 has a bore 214 for housing a portion of piston shaft 202 passing therethrough from its upper end face to the lower end face of boss 210 with the center line of the bore 214 coinciding with the longitudinal centerline of bore 188 in cylinder 178.

A leak return line 216 is provided for removal of any hydraulic fluid leakage that may take place between the elements 232 and 228 and their respective cylinders. Such leakage may develop after the elements 232 and 228 have become worn, and the line 216 permits removal of such leakage. In addition, O-rings 222, 224 are provided between bore 188 and boss 210 and bores 188, 214 and shaft 202 to prevent leakage of hydraulic fluid from the piston and cylinder assembly.

Piston assembly 182 comprises a shaft 202 having a piston sleeve 200 mounted thereon and a lower portion 226 for mounting chamfering tool assembly 172 on the piston assembly. Shaft 202 is of varying external diameter having four successive portions 226, 228, 230, 232, interconnected by waisted portions, of successively smaller diameter with the uppermost portion of the shaft having the smallest diameter.

The upper end face of the shaft 202 is provided with a threaded axially extending aperture having a bolt assembly 234 threadedly mounted therein. Bolt 234 has an enlarged, unthreaded portion intermediate the head of the bolt and the threaded portion of the assembly whereby the inward movement of the bolt is limited by the shoulder formed between the threaded portion and the enlarged portion thereby correctly positioning the bolt assembly 234 within the aperture. A pair of washers 238, 240 and a coil spring 242 are carried on bolt assembly 234 intermediate the head of the bolt and the upper end face of shaft 202. Coil spring 242 urges washers 238, 240 apart and when the tool is at the lowermost portion of its stroke, as shown in FIG. 7, the coil spring urges the washer 240 into contact with the upper end face of cap 208. This construction not only acts as a dampening means as the lowermost portion of the cutting stroke is reached, but also, through the engagement of washer 240 with the upper end face of cap 208, seals off an air outlet 242 in the upper end face of the hydraulic piston and cylinder assembly 170 actuating an air switch in the control system to cause the retraction of the piston assembly 180 to its initial position.

Piston sleeve 200 is mounted on portion 230 of shaft 202 with the lower end face of the sleeve abutting the shoulder formed between sections 228 and 230 of the shaft and the upper end face of the sleeve abutting a lock nut 244 which is retained on a threaded section of the waisted portion between sections 232 and 230. Lock nut 244 is tightened against the shoulder on shaft 202 allowing the sleeve 200 to "float" or to align itself in bore 188. To prevent hydraulic fluid from passing between the upper and lower chambers of the enlarged portion of the piston bore 188, an O-ring 246, which engages section 230 is carried within an annular groove within piston sleeve 200 and the sliding fit between the outer surface of piston sleeve 200 and the bore 188 is such that any passage of hydraulic fluid between the upper and lower cylinders would be insignificant.

The lowermost portion 226 of shaft 202 is an enlarged semicircular portion having a flattened surface which allows the chamfering assembly to be positioned adjacent the workpiece-centering and clamping assembly. The upper face 250 of shaft portion 226 is planar and cooperates with the planar underside of cylinder 178 to seal off an air outlet 252 in the underside of cylinder 178 to actuate an air switch in the control system which either initiates the chamfering of the next tooth on the workpiece or the removal of the workpiece from the chamfering unit if the chamfering cycle has been completed.

The underside of portion 226 is provided with a semicircular flange 254 with the inner diameter of the flange having a radius of curvature substantially equal to but greater than the radius of curvature of the upper annular flange 256 on the sleeve 258 of chamfering tool assembly 172. A clamping ring 260 having an internal diameter substantially equal to but greater than the external diameter of chamfering tool assembly sleeve 258 is slidably mounted on sleeve 258 and bolted to flange 254 by a plurality of bolt assemblies 262 or equivalent fastening means. The width of annular flange 256 on sleeve 258 and the height of flange 254 on portion 226 of shaft 202 are such that when clamping ring 260 is secured to portion 226, the annular flange 256 on holder 258 is securely clamped in position intermediate the ring and the central end face of portion 226.

To prevent shaft 202 and, therefore, sleeve 258 of assembly 172 from rotating, flange 254 is provided with a slot 264 in its outer surface which cooperates with a key 266 that is bolted to the end face of cylinder 178. The relative widths of slot 264 and key 266 are such that a snug sliding fit is formed between the members thereby permitting axial movement of shaft 202 relative to key 266, while preventing any rotational movement of the shaft with respect to the key or the cylinder 178.

Chamfering tool assembly 172 comprises a sleeve 258 with an upper annular flange 256 which, as described in the preceding paragraph, is rigidly affixed to the end 226 of the tool shaft 202 and a chamfering tool 268 carried by sleeve 258. The upper end of chamfering tool 268 is mounted within sleeve 258 and is provided with a longitudinally extending keyway 270 in its outer surface which cooperate with key 272 to permit axial adjustment of the chamfering tool relative to sleeve 258, but prevent rotational movement of tool relative to sleeve 258. As can be seen in FIG. 7, key 272 is fastened by bolt assembly 274 or equivalent fastening means within a slot passing through sleeve 258 with the innermost end of key 272 extending into the keyway 270 and making a snug sliding fit with the keyway.

The upper end face of tool 268 is provided with a threaded aperture into which a stud 276 is threaded for the purpose of adjusting the extent to which tool 268 protrudes beyond sleeve 258. Once the stud 276 has been adjusted so that the tool 268 will have the proper setting, the jamb nut 278, carried on the stud, is tightened against the end face of tool 264 to lock the stud in place and the head of the stud is placed in abutting relationship with the lower end face of shaft 202. In this way, the cutting load is transferred from tool 268 through stud 276 directly to the end of shaft 202. To prevent the tool 268 from sliding relative to the sleeve, sleeve 258 is provided with a setscrew 280 which passes through the sidewall of the sleeve and frictionally engages tool 268.

Bracket assembly 176 for securing hydraulic piston cylinder assembly 170 to reciprocating tool mount 174, includes flanges 182, 184 on cylinder 178 which are secured by bolt assemblies 194, 196 to a vertical slide 282. The slots 190, 192 in flanges 182, 184 and bolt assemblies 194, 196, in conjunction with boss 186, permit angular adjustment of cylinder 178 about a horizontal axis parallel to the longitudinal axis of the reciprocating tool mount 174 and perpendicular to the longitudinal axis passing through the upper and lower workpiece-centering and clamping assemblies 22, 24.

As shown in FIGS. 2, 3 and 7, boss 186 is received within a central depression 284 of vertical slide 282, which is interposed midway between bolt assemblies 286, 288 that secure vertical slide 282 to horizontal slide 290. Bolt assemblies 286 and 288 are identical in structure and function. Therefore, the following detailed description of assembly 288 and the manner of securing the assembly to horizontal slide 290 applies to assembly 286 to avoid unnecessary repetition.

Figure 9:
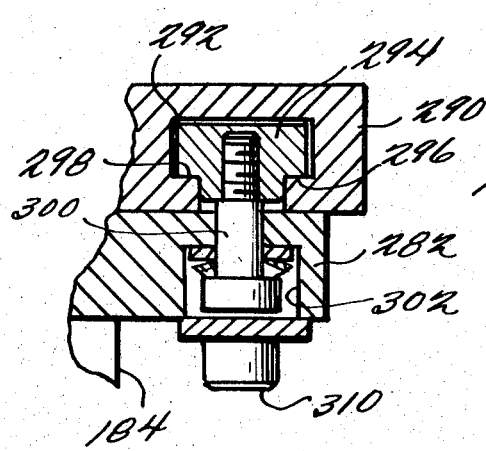
FIG. 9 is an enlarged fragmentary view of the mounting brackets substantially along lines 9–9 of FIG. 3.

As shown in FIGS. 3 and 9, horizontal slide 290 is provided with a pair of elongated, vertically extending slots 292, 293, positioned adjacent the lateral edges of the slide and having T-shaped cross sections with rounded ends. Slidably mounted within slot 292 is a shoe 294 having a complementary cross section and flat, chamfered end portions. Shoe 294 is housed completely within slot 292 with the shoulders 296 of the shoe being held in frictional engagement with the shoulders 298 of slot 292 by means of a stud 300.

Stud 300 is mounted within recess 302 positioned along the horizontal center line of vertical slide 282 and spaced from the recess of assembly 286 a distance equal to the spacing of slots 292. The stud has an unthreaded portion passing through vertical slide 282 and a threaded portion of smaller diameter which is threaded into an aperture in shoe 294. The aperture is located midway between the ends of shoe 294 with the stud being threaded into shoe 294 until the shoulder between the threaded and nonthreaded portions abuts the face of shoe 294. A washer 304 and an annular leaf spring 302 are interposed between the head of stud 300 and the end face of depression 302 thereby biasing the stud 300 outwardly relative to slot 292 and causing the shoulders 296 of shoe 294 to frictionally engage the shoulders 298 of slot 292. The friction between the shoulders 296 and 298 impedes the sliding movement of the shoe 294 relative to slot 292 and, consequently, vertical slide 282 relative to horizontal slide 290 to facilitate the vertical adjustment of slide 282 relative to slide 290.

Bolt assembly 288 is provided with a pair of studs 308 and 310, which pass through a pair of apertures in vertical slide 282 that are in vertical alignment with the vertical centerline passing through slot 292, shoe 294 and stud 300. Studs 308 and 310 are threaded into shoe 294 at either end thereof and when tightened, firmly lock the vertical slide against movement relative to horizontal slide 290. An elongated cover plate 312 is carried by the bolts 308, 310 intermediate the heads of the bolts and the face of vertical slide 282. Cover plate 312 covers depression 302 and also acts as a washer for bolts 308, 310.

As shown in FIG. 2, for the purpose of guiding the vertical movement of vertical slide 282 relative to horizontal slide 290, an elongated key 314 is provided on the rear face of the vertical slide, which is received within a vertically extending slot or keyway 316 in horizontal slide 290. The sliding fit between elongated key 314 and keyway 316 maintains the slide 282 in proper vertical alignment.

Horizontal slide 290 is provided with upper and lower sets of elongated horizontal slots 318, 320 through which bolt assemblies 322, 324 are threaded into the face plate 326 of reciprocating tool mount 174. When both sets of bolt assemblies 322 and 324 are loosened, the slots 318, 320 in horizontal slide 290 permit the slide to be moved laterally with respect to face plate 326 of the reciprocating tool mount. However, when the assemblies 322, 324 are tightened horizontal slide 290 is rigidly affixed to the face plate of the reciprocating mount 174. To facilitate the lateral movement of horizontal slide 290 relative to face plate 326 and to maintain the proper alignment between the two members, horizontal slide 290 is provided with a horizontally extending elongated key 328 which is slidably received within keyway 330 of face plate 326.

Reciprocating tool mount 174 comprises a cylinder 332 which houses a piston assembly 334. Cylinder 332 is rigidly affixed to the frame of the chamfering machine by bolt assemblies or equivalent fastening means (not shown) so that the longitudinal center line of the cylinder bore 336 extends horizontally and passes through the longitudinal vertical centerline of workpiece-centering and clamping assemblies 22 and 24. The cylinder is of varying internal diameter with one portion of the bore 336 housing the piston 338 of assembly 334, while a reduced portion of the bore 336 houses piston shaft 340 of assembly 334 to which face plate 326 is secured by bolt assemblies 342. The outer end of cylinder 332 is provided with an end cap 346 having a bore therein which receives a threaded shaft 344 of piston assembly 334. The end cap 346 is bolted to cylinder 332 and is provided with an annular boss 350 which is received within an enlarged end portion of the bore and aligns the end cap with the cylinder 332.

The cylinder 332 is provided with inlet-exhaust ports 352, 354 (for supplying and exhausting pressurized fluid from the bore 336) which communicate with the bore of the cylinder on opposite sides of piston 338 of assembly 334 to thereby effect the reciprocating movement of the piston within the cylinder. In addition, end cap 346 and cylinder 332 are provided with leak return lines 356 which will remove any hydraulic fluid which might be forced beyond the seals and resulting fit between 336 and 346, 336 and 338, and 332 and 340. In addition, seals 358, 360, 361, 362, 364 and 366 are provided to prevent the seepage of hydraulic fluid within the reciprocating tool mount 174.

The threaded shaft 344 of piston assembly 334 is provided with a pair of collars 368, which are threadedly mounted on shaft 344 and can be adjusted along shaft 344 to limit the inward movement of the tool mount 174. The advance of the piston is arrested by the abutment of collars 368 with end face 372 of cap 346. Just prior to contacting end face 372, collars 368 contact a projection 374 on a lever 376 which is pivotally mounted on a pin 378 within a vertically extending slot in the end face of cap 346. The contact of collars 368 with the projection 374 causes the lever 376 to pivot about pin 378 and results in the actuating of limit switch D by lever 376. As shown in FIG. 10, a second pin 380 is received within an aperture 381 of the lever 376 to limit the pivotal movement of the lever about pin 378. The pin 380 is considerably smaller in diameter than aperture 381 thereby permitting the limited pivotal movement of lever 376, while maintaining the lever in proper position for actuation.

To prevent rotational movement of piston assembly 334 relative to cylinder 332, a key 382 is bolted to the face plate 326 of the reciprocating mount 174. The key 382 is slidably received within a horizontally extending keyway 384 in the upper portion of the cylinder sidewall to thereby maintain the proper orientation between the piston assembly 334 and the cylinders 332. In addition, key 382 is provided with a bracket 388 on its outer terminal end for actuating limit switch E mounted on end cap 346.

Bracket 388 is substantially L-shaped with a vertically extending arm within which is threadedly mounted contact element 390 for contacting the limit switch. A jamb nut 392 is provided to lock the element 390 in place once it has been properly adjusted to actuate the limit switch when the piston assembly 334 is in its withdrawn position.

Indexing assembly 30 comprises a piston and cylinder assembly 400 and a workpiece-indexing element 402 which is mounted on the piston and cylinder assembly 400. Cylinder 404 of piston and cylinder assembly 400 has a bore 406 therein with a vertically extending centerline and inlet-outlet ports 408, 410 which communicate with the bore on opposite sides of the piston 412 which is housed within the bore of cylinder. To prevent rotation of piston 412 about its vertical axis and, consequently, the rotation of the indexing element 402 mounted on the lower piston shaft of the assembly, a key 414 that is threadedly mounted in an aperture extending through the cylinder sidewall is received within and cooperates with a longitudinally extending keyway or slot 416 in the outer surface of piston 412 thereby preventing any rotation of the piston about its vertical axis.

Cylinder 404 is provided with upper and lower end caps 418 and 420 with end cap 420 having a pair of flanges 422, 424 with a radius of curvature substantially equal to the radius of curvature of a flange 426 extending part of the way around the lower terminal portion of sleeve 102. Flange 426 has a T-shaped slot 428 therein extending from one end of the flange to the other. A shoe 430, having the same curvature as the slot, is slidably received within slot 428 and serves as a retaining means into which bolt assemblies 432, 434 of flanges 422, 424 are threaded to firmly affix the indexing assembly 30 to the upper centering and clamping assembly 24. The flanges 422, 424 and the curved surface of end cap 420 intermediate the flanges is provided with an annular key 436 which is received within slot 428 to help align and maintain the end cap in position relative to the slot. The dimensions of key 436, shoe 430 and slot 428 are such that even when bolt assemblies 432, 434 are firmly tightened, there is no contact between shoe 430 and key 436 thereby preventing any interference of key 436 with the clamping of the end cap 420 to flange 426.

Upper and lower end caps 418 and 420 are secured to the cylinder 404 by bolt assemblies 438, 440 and are each provided with bosses 442, 444 which are slidably received within the ends of bore 406. The bores 446 and 448 pass through end caps 418, 420 and slidably retain shafts 450, 452 of piston 412. Since shaft 452, which is larger in diameter than shaft 450, passes through bore 448, bore 448 is correspondingly greater in diameter than bore 446.

Leak return line 454 to remove hydraulic fluid that is forced by the resulting seals and fits. The seepage of hydraulic fluid within the indexing assembly is prevented by seals 456, 458, which are provided intermediate the end caps and the cylinder, and seals 460, 462, 464 and 466 which are housed within the bores of the end caps 418, 420 on opposing sides of the leak return 454.

Shaft 452 is greater in diameter than shaft 450 so that the underside of piston 412 has less effective area than the upperside of the piston. Port 408, which communicates with the cylinder bore 406 on the upperside of piston 412 alternately supplies and exhausts pressurized fluid from the upper chamber of the cylinder bore while port 410 continuously supplies pressurized fluid, at the same pressure, to the underside of the piston 412. Due to the difference in the surface area of the upperside and underside of the piston 412, when pressurized fluid is admitted to the upperside of the piston a downward stroke of the piston is effected. However, since pressurized fluid is still admitted to the underside of the piston, the downward stroke is dampened thereby resulting in a smoother, better regulated stroke which can be adjusted to precise tolerances. Of course, as soon as the hydraulic fluid is exhausted from the upperside of the piston 412, the piston is returned to its initial position by the pressurized hydraulic fluid within the lower chamber of the cylinder bore.

Shafts 450, 452 each have threaded end portions which receive threaded collars 468 and 470 thereon for the purpose of adjusting the length and the limit of the piston stroke. The downward movement of the piston is limited by the engagement of collars 468 with the upper end face of end cap 418, while the upward movement of the piston is limited by the engagement of collar 470 with the lower end face of cap 420. The upper and lower end caps are each provided with levers 472, 474 which are pivotally retained in horizontally extending slots extending across the upper end face and lower end face, respectively, of the end caps.

The levers 472, 474, which are pivotally retained on pins 476, 478, have projections 480, 482 mounted in the end caps, which normally extend beyond the end faces of the end caps and apertures 484, 486 therein which cooperate with pins 488, 490 of the end caps to limit the pivotal movement of the levers about pins 476, 478. When the piston 412 reaches the lower end of its stroke, collars 468 engage projection 480 pivoting lever 472 about pin 476 and causing the actuation of limit switch B which is secured to the outer surface of cylinder 404. When piston 412 reaches the upper end of its stroke, collar 470 engages the projection 482 on lever 474 pivoting the lever about pin 478 whereby the lever actuates limit switch C which is also secured to the outer surface of cylinder 404 by bolt assemblies or other suitable fastening means.

Indexing element 402 is secured to shaft 452 of piston 412 by means of a bracket 500. Bracket 500 is substantially channel shaped in transverse cross section having a pair of depending flanges 502, 504 which form a keyway for indexing element 402. Bracket 500 is secured to the end face of shaft 452 by bolt assembly 506 which passes from a central depression 508 in bracket 500 up through the bracket and is threaded into the end of shaft 452. Bolt assembly 506 rigidly affixes bracket 500 to shaft 452. However, to further insure that there is no relative rotation between the bracket 500 and shaft 452 which would cause a misalignment of the indexing element, a key 510 is provided to engage a keyway of shaft 452.

Indexing element 402 comprises a sleevelike housing 512 with a pair of outwardly extending flanges 514, 516 and a longitudinally extending key portion 518 which is received within the keyway formed between flanges 502, 504 of bracket 500. Flanges 514 and 516 have a pair of elongated slots 520, 522 through which bolt assemblies 524, 526 pass to secure indexing element 402 to bracket 500. Indexing element 402 can be adjusted relative to bracket 500 in a direction parallel to the longitudinal centerline of the indexing element by loosening bolt assemblies 524 and 526, sliding the indexing element along the keyway and then retightening assembly 524, 526.

Sleevelike element 512 has a bore 530 extending longitudinally therethrough of varying internal diameter. The enlarged portion of the bore 530 is closed at one end by a plug 532 which is threadedly retained in the bore and houses the inner portion of a spring-biased finger 534 which extends through the reduced portion of the bore and projects beyond the end face of element 512. Finger 534 has a ball portion 536 at one end, which is connected by an intermediate portion 538 to an enlarged sleeve portion 540 which houses a coil spring 542 that extends between plug 532 and the end face of the aperture within portion 540 to urge the finger 534 toward the workpiece. The shoulder formed between the intermediate portion 538 and enlarged portion 540 limits the outward movement of the finger 534 relative to the housing 512 as the finger is extended into the slots formed between the teeth of the workpiece while the annular end face of portion 540 and the inner end face of plug 532 limit the extent to which finger 534 can be forced into the housing as it rides over workpiece teeth during the upward stroke. Bearing assembly 544 is interposed between the surface of bore 530 and finger 534 to facilitate the reciprocal and rotational movement of the finger relative to the housing 512 so that the extension or retraction of finger 534 relative to the housing will not be impeded.

To facilitate the initial adjustments of the chamfering unit and any subsequent adjustments, scales are provided on the various components. Scales 550, 552 and 554 are provided on flange 182, vertical slide 282, and horizontal slide 290 to provide a means for accurately adjusting piston and cylinder assembly 170 relative to the workpiece. Scale 556 is provided on annular flange 256 of the chamfering tool assembly to position the chamfering tool with respect to the longitudinal axis of the piston and cylinder assembly 170. Scales 558, 560 and 562 are provided on flattened portions of piston shafts 344, 350 and 352 to adjust the strokes of piston assemblies 334 and 412 and scale 564 is provided on bracket 500 to facilitate the adjustment of indexing element 402.

OPERATION

Figure 12:
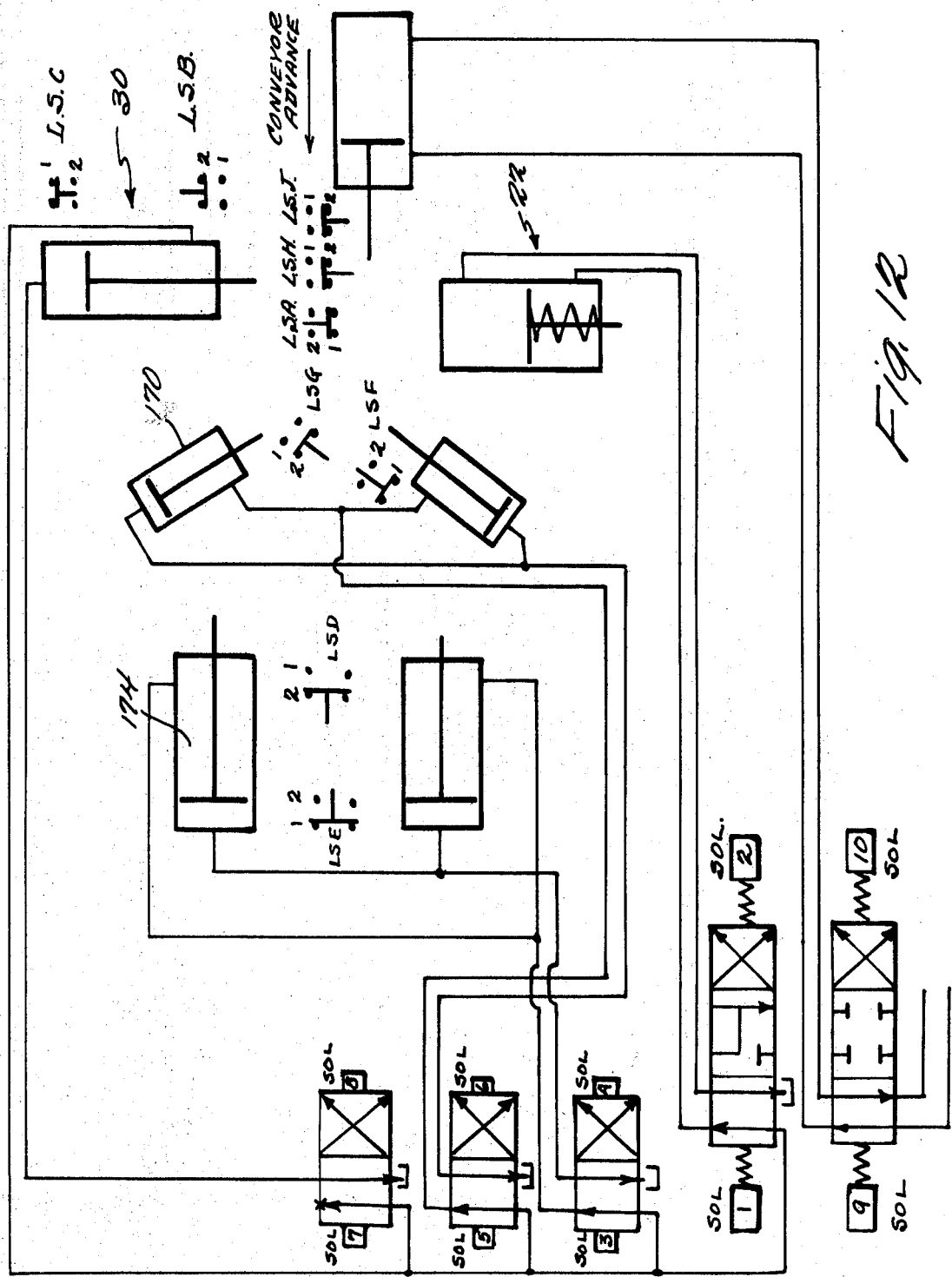
FIG. 12 is a diagrammatic representation of the electrohydraulic control system for the chamfering unit.
Figure 13:
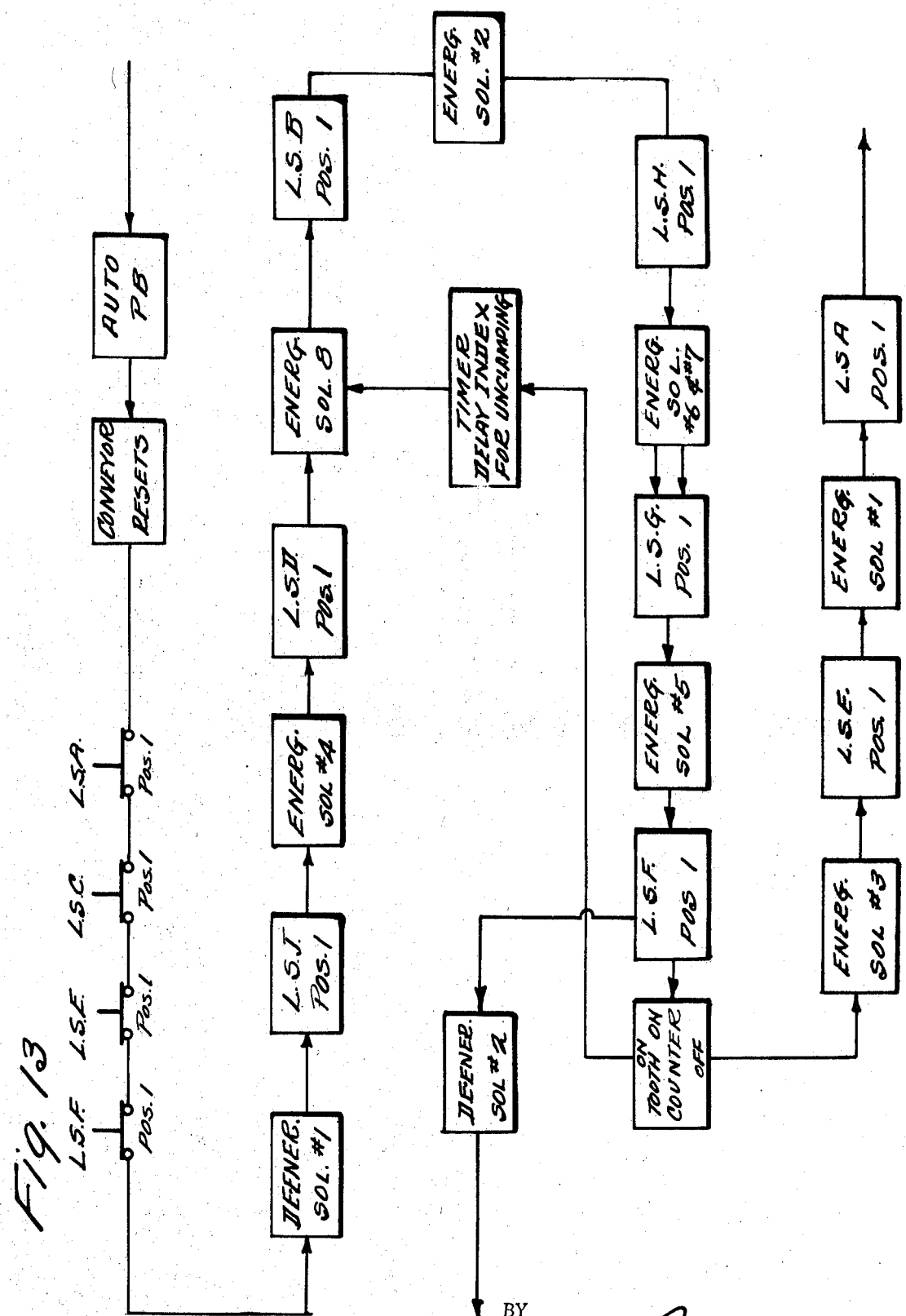
FIG. 13 is a schematic representation of the chamfering cycle for the chamfering unit of the present invention.

The following description of the operation of the chamfering unit relates to the use of the chamfering unit as part of a pinion machine. In the layout, position 1 of the limit switches represents the depressed position of the switches when they are in contact with an actuating element, while position 2 of the limit switches represents the switches in their extended position when they are not in contact with an actuating element. The electrohydraulic layout of FIG. 12 shows the control system at the beginning of a chamfering cycle with the limit switches in their initial position. The conveyor advance of the pinion machine has centered a workpiece or pinion gear between the upper and lower workpiece-centering and clamping assemblies 22, 24 and as the piston of the conveyor advance resets the cycle is begun.

At the outset of the cycle, limit switch A is in position 1 whereby a circuit is completed to allow the conveyor advance of the pinion machine; limit switch C is in position 1 whereby solenoid 7 is energized and the upper side of the piston 412 in the indexing cylinder is exhausted and the underside pressurized to maintain a piston 412 in its upper position; limit switch E is in position 1 actuating solenoid 3, which exhausts the outer side of the pistons 338 in the reciprocating mounts and pressurize the inner side of the pistons so that they are in their withdrawn position and limit switch F is in position 1 wherein solenoid 5 is energized to admit pressurized fluid to the inner sides of piston sleeves 200 in the upper and lower chamfering cylinders while exhausting the outer sides of the respective pistons so that the pistons of the chamfering cylinders are in their withdrawn position.

The resetting of the conveyor advance piston deenergizes solenoid no. 1 whereby both the upper and lower sides of piston 38 in the lower centering and clamping assembly are on exhaust. This allows the spring 66 within the lower centering and clamping assembly to force the piston 38 of the assembly upward whereby the workpiece 32 is engaged by the pilot 36 of the lower assembly, lifted off the conveyor 34 by the pilot and engaged by the pilot 148 of the upper centering assembly. This causes a limited upward movement of the upper pilot rod 148 against the pressure of the inner spring 132 until collar 120 contacts the sleeve 124 whereupon the combined pressure of the two upper springs is greater than the pressure of spring 66 in the lower assembly and the upward movement of the lower piston, workpiece and the upper pilot rod is arrested. The upper movement of the pilot rod 148 causes a sufficient upward movement of rod 112 so that a limit switch A is no longer in contact with element 114 and goes to position 2 thereby preventing any further conveyor advance until the completion of the chamfering cycle and wherein limit switch J is contacted by element 116 and moved to its position 1 thereby energizing solenoid 4 to pressurize the outer surfaces of pistons 338 and exhaust the inner surfaces of the pistons to cause the inward movement of the reciprocating mounts. When the mounts 174 have reached their innermost position, collars 368 abut end faces 372 of the end cap and levers 376 have been pivoted into contact with limit switches D which move to position 1 whereby solenoid 8 is energized allowing stock dividing and the pressurizing of the upper side of piston 412 in the index cylinder which, due to its greater surface area, forces the piston down against the pressure exerted on the underside of the piston. The pressure on the underside of the piston 412 acts as a dash pot for the downward stroke of the index cylinder. The finger 534 initially engages a slot formed between gear teeth as the workpiece is lifted off the conveyor, and as piston 412 moves down, indexing finger 534 causes the workpiece to rotate due to the spiral or helical formation of the gear teeth.

At the bottom of this downward stroke, collars 468 on shaft 450 contact lever 472 causing the movement of limit switch B to position 1 wherein switch B energizes solenoid 1, which keeps the upper side of the piston 38 in the lower centering and clamping cylinder on exhaust, but pressurizes the underside of the piston whereby the combined force of the spring 66 in the lower assembly and the pressure on the underside of the piston overcomes the combined forces of the springs 132, 134 in the upper centering assembly and the workpiece is moved up until it contacts the pilot housing of the upper centering and clamping cylinder. Once the workpiece engages the notched underside of the upper pilot housing, the notches in the underside of the housing combine with the additional pressure on the workpiece to firmly clamp the workpiece in position between the two centers.

The upward movement of the workpiece relative to the indexing finger during the clamping of the workpiece results in a slight additional movement of the workpiece about its axis. However, since the additional movement is the same for like workpieces, the additional movement can be compensated for by the adjustment of the stroke of piston 412.

The additional upward movement of rod 112 causes the actuation of limit switch H by element 118 moving the switch to position 1 which energizes solenoids 6 and 7. Solenoids 6 put the inner sides of the piston sleeves 200 in the chamfering cylinders on exhaust and pressurize the outer sides of the pistons thereby bringing the chamfering tools in on their chamfering strokes. The actuation of solenoid 7 causes the upper side of the piston 412 in the index cylinder to be put on exhaust whereby the piston in the cylinder withdraws to its initial position thereby moving limit switch C back to its initial position 1 which keeps the solenoid 7 energized and maintains the piston in its upper position and moving limit switch B back to position 2. Since the workpiece 32 is firmly clamped in place during the upward stroke or withdrawal stroke of the piston 412, finger 534 of the indexing unit slides over the top of the gear teeth with the teeth forcing the finger back into its housing against the pressure of the spring. Since the workpiece is firmly clamped in place, no movement of the workpiece occurs during the resetting of the indexing assembly.

The inward movement of piston assemblies 180 causes collars 240 to contact the outer ends of the cylinders thereby closing the ports which actuate remote air switches G. The actuation of limit switches G energizes solenoid 5 thereby pressurizing the inner sides of the piston assemblies 180 and exhausting the outer sides of the pistons to cause the withdrawal of the pistons until limit switch F is moved back to position 1 which maintains the pressure on the underside of the piston, while exhausting the outer sides of the pistons in the chamfering cylinders. Limit switch F also deenergizes solenoid 2 exhausting the upper and lower side of piston 38 in the lower centering and clamping assembly which thereby causes the downward movement of the workpiece 32, unclamping the same and the limited downward movement of rod 112 which returns limit switch H to its original position 2. Limit switch F also energizes a tooth counter which either actuates a timer that delays the energization of solenoid 8 by limit switch D, which is still in position 1, to allow time for the pinion to be unclamped prior to the initiation of the indexing stroke or after the last tooth has been chamfered, energizes solenoid 3 placing the outer sides of the pistons on the reciprocating mounts on exhaust and the inner sides on pressure to cause a withdrawal of the chamfering assemblies from their operating position. As the reciprocating mounts 174 reach their outermost position, elements 390 actuate limit switches E moving the switch to position 1 thereby energizing solenoid no. 1 which pressurizes the upper side of piston 38 and exhausts lower side of piston 38 in the lower centering and clamping assembly to cause the lowering of the pinion onto the conveyor. The downward movement of the workpiece causes downward movement of rod 112 in the upper centering and clamping cylinder which causes the return to limit switch A to position 1 which completes the circuit that permits the conveyor to index bringing in the next workpiece. Since the chamfering operation is accomplished in less time than some of the other operations on the pinion machine the position of limit switch A in position 1 does not actuate the conveyor advance, but merely completes a circuit which allows a signal from the master control system of the pinion machine to cause the conveyor advance.

While solenoid 1 was deenergized by means of a signal from the conveyor advance system of the pinion machine in the above description of the operation, it is to be understood that a chamfering unit can be operated independent of the pinion machine and that solenoid 1 can be deenergized by means of a manually operated switch or a signal from a similar type of gear-generating machine. Of course, once solenoid 1 has been energized, the chamfering cycle would be the same as that outlined above with the exception that in some instances, limit switch A could be omitted.

For setting the chamfering tools relative to the workpiece, reciprocating mounts 174 and brackets 176 are provided. The mounts and bracket assembly permit the adjustment of the chamfering assembly along the three major axes and angular adjustment about one of the horizontal major axes passing through the longitudinal centerline of the upper and lower centering and clamping assemblies. Adjustments on the mounts 174 and mounting bracket assemblies 176 in conjunction with the scales appearing on these brackets, permit a precise adjustment of the chamfering assembly relative to a workpiece held between the upper and lower centering and clamping cylinders. In addition, the adjustment permitted between the piston shafts 202 of the upper and lower chamfering cylinders and the tool holders 172 permits an axial adjustment about the longitudinal axis of the upper and lower piston and cylinder assemblies 170 of the tool to thereby further insure that the chamfering tools can be properly adjusted at their required angle for chamfering the toe portion and heel portions of the pinion teeth. Of course, the independent adjustments for the upper and lower piston and cylinder assemblies 170 permit the upper and lower chamfering tools to be adjusted for the specific requirements at the toe and heel of the gear teeth so that the desired cut can be made during the chamfering stroke. While shown working on the same tooth, if required, the upper and lower chamfering tools can be adjusted to chamfer different teeth.

With regard to the index assembly, it can be seen that the length and extent of the piston stroke can be adjusted by collars 468 and 470 with the adjustment being facilitated by the scales provided on the piston shaft. These permit the indexing assemblies to be adjusted for a certain amount of reciprocal movement with regard to the workpiece to thereby cause the required amount of rotation of the workpiece during the indexing cycle. In addition, the slides and scale on bracket 500 permit the accurate adjustment of the indexing element relative to the workpiece so that the extension of finger 534 into the slot between the teeth is correct for the particular workpiece.

Having now described the preferred embodiment and operation of the chamfering unit, it will be apparent that various modifications and equivalents can be resorted to without departing from either the spirit or scope of the invention.

We claim:

1. A chamfering unit for chamfering a toothed workpiece comprising:
workpiece-centering and clamping means for retaining workpiece means during a chamfering operation;
chamfering means for chamfering spirally arranged tooth means of said workpiece means held by said centering and clamping means; and
workpiece-positioning and indexing means for properly aligning said tooth means of said workpiece means with said chamfering means, said workpiece positioning and indexing means being movable relative to said tooth means in a direction substantially parallel to the axis of rotation of said workpiece means for stock dividing the workpiece when the workpiece is initially received between said centering and clamping means and for incrementally indexing the workpiece relative to said chamfering means during a chamfering operation.

2. In the chamfering unit of claim 1 said workpiece-indexing means having finger means for engaging said tooth means and drive means for moving said finger means relative to said workpiece means to effect the positioning and indexing of said tooth means.

3. In the chamfering unit of claim 1 said workpiece-indexing means having finger means for engaging said tooth means and driving means for moving said finger means relative to said tooth means of said workpiece means to effect the alignment of said tooth means.

4. In the chamfering unit of claim 3 means for adjusting said chamfering means along the three major axes and for angularly positioning said chamfering means about one of said axes.

5. In the chamfering unit of claim 3 control means for automatically regulating the operating sequence of said workpiece-centering and clamping means, said chamfering means and said workpiece-indexing means to effect the chamfering of a workpiece means.

6. In the chamfering unit of claim 1 said workpiece-centering and clamping means having opposed centering means for retaining workpiece means therebetween and means for varying the pressure exerted on workpiece means by said opposed centering means to allow rotational movement of workpiece means relative to said centering and clamping means during the indexing of workpiece means and to maintain workpiece means in a fixed position during the chamfering of the tooth means of the workpiece means.

7. In the chamfering unit of claim 6 said workpiece-centering and clamping means having means for frictionally engaging workpiece means when the workpiece means is clamped between said opposed centering means to help prevent rotation.

8. In the chamfering unit of claim 1 means for adjusting said chamfering means along the three major axes and for angularly positioning said chamfering means about one of said axes.

9. In the chamfering unit of claim 8 scale means on said adjusting means to facilitate the adjustments of said chamfering means along and about said axes.

10. In the chamfering unit of claim 1 control means for automatically regulating the operating sequence of said workpiece-centering and clamping means, said chamfering means and said workpiece-indexing means to effect the chamfering of a workpiece means.

11. A chamfering unit for chamfering a toothed workpiece comprising:
a workpiece-centering and clamping means for retaining workpiece means during a chamfering operation;
said workpiece-centering and clamping means having opposed centering means for retaining workpiece means therebetween and means for varying the pressure exerted on workpiece means by said opposed centering means to allow rotational movement of workpiece means relative to said centering and clamping means during indexing of workpiece means and to maintain workpiece means in a fixed position during the chamfering of a tooth means of the workpiece means;
chamfering means for chamfering tooth means of said workpiece means held by said centering and clamping means; and
workpiece-indexing means for properly aligning said tooth means of said workpiece means with said chamfering means, said workpiece-indexing means effecting the alignment of said tooth means through the engagement of said tooth means by said indexing means.

12. In the chamfering unit of claim 11 said workpiece-centering and clamping means having means for frictionally engaging workpiece means when the workpiece means is clamped between said opposed centering means to help prevent rotation.

13. A chamfering unit for chamfering a toothed workpiece comprising:
workpiece-centering and clamping means for retaining workpiece means during a chamfering operation, said workpiece-centering and clamping means having opposed centering means for retaining workpiece means therebetween and means for varying the pressure exerted on workpiece means by said opposed centering means to allow rotational movement of workpiece means relative to said centering and clamping means during the indexing of workpiece means and to maintain workpiece means in a fixed position during the chamfering of the tooth means of the workpiece means, said workpiece-centering and clamping means further having means for frictionally engaging workpiece means when a workpiece means is clamped between said opposed centering means to help prevent rotation;
chamfering means for chamfering tooth means of said workpiece means held by said centering and clamping means;
workpiece-indexing means for properly aligning said tooth means of said workpiece means with said chamfering means, said workpiece-indexing means effecting the alignment of said tooth means through the engagement of said tooth means by a finger means, and including driving means for moving said finger means relative to said tooth means of said workpiece means in a direction substantially parallel to an axis of rotation of said workpiece means to effect the alignment of the tooth means; and
means for adjusting said chamfering means along the three major axes and for angularly positioning said chamfering means about one of said axes.

14. A chamfering unit for chamfering a toothed workpiece comprising:
workpiece-centering and clamping means for retaining workpiece means during a chamfering operation, said workpiece-centering and clamping means having opposed centering means for retaining workpiece means therebetween and means for varying the pressure exerted on workpiece means by said opposed centering means to allow rotational movement of workpiece means relative to said centering and clamping means during the indexing of workpiece means and to maintain workpiece means in a fixed position during the chamfering of the tooth means of the workpiece means, said workpiece-centering and clamping means further having means for frictionally engaging workpiece means when a workpiece means is clamped between said opposed centering means to help prevent rotation;
chamfering means for chamfering tooth means of said workpiece means held by said centering and clamping means;

workpiece-indexing means for properly aligning said tooth means of said workpiece means with said chamfering means, said workpiece-indexing means effecting the alignment of said tooth means through the engagement of said tooth means by a finger means, and including driving means for moving said finger means relative to said tooth means of said workpiece means in a direction substantially parallel to an axis of rotation of said workpiece means to effect the alignment of the tooth means; and control means for automatically regulating the operating sequence of said workpiece-centering and clamping means, said chamfering means and said workpiece-indexing means to effect the chamfering of a workpiece means.

15. In combination with a conveyor means for roughed gears which conveyor feeds said gears in intermittent step-by-step fashion, a chamfering unit operatively connected to said conveyor means and including:

workpiece-centering and clamping means for retaining workpiece means during a chamfering operation, said workpiece-clamping means having opposed centering means for retaining workpiece means therebetween and means for varying the pressure exerted on workpiece means by said opposed centering means to allow rotational movement of workpiece means relative to said clamping means during the indexing of workpiece means and to maintain workpiece means in a fixed position during the chamfering of the tooth means of the workpiece means;

chamfering means for chamfering tooth means of said workpiece means held by said clamping means; and means for operating said chamfering means during periods when the conveyor means is stationary.

16. In the combination of claim 15 workpiece-indexing means for properly aligning said tooth means of said workpiece means with said chamfering means, said workpiece-indexing means effecting the alignment of said tooth means through the engagement of said tooth means by said indexing means.

17. In the chamfering unit of claim 16 control means for automatically regulating the operating sequence of said workpiece-centering and clamping means, said chamfering means and said workpiece-indexing means to effect the chamfering of a workpiece means.

18. In the combination of claim 15 said workpiece-indexing means having finger means for engaging said tooth means and drive means for moving said finger means relative to said workpiece means.

19. In the combination of claim 15 said workpiece-indexing means having finger means for engaging said tooth means and drive means for moving said finger means relative to said tooth means of said workpiece means in a direction substantially parallel to an axis of rotation of said workpiece means.

20. In the chamfering unit of claim 15 said workpiece-clamping means having means for frictionally engaging workpiece means when the workpiece means is clamped between said opposed centering means to help prevent rotation.

21. In the chamfering unit of claim 15 means for adjusting said chamfering means along the three major axes and for angularly positioning said chamfering means about one of said axes.

22. In the chamfering unit of claim 21 scale means on said adjusting means to facilitate the adjustments of said chamfering means along and about said axes.

23. In the chamfering unit of claim 15 control means for automatically regulating the operating sequence of said workpiece-centering and clamping means, said chamfering means and said workpiece indexing means to effect the chamfering of a workpiece means.

24. In the chamfering unit of claim 15 means for adjusting said chamfering means along the three major axes and for angularly positioning said chamfering means about one of said axes.

25. In the chamfering unit of claim 24 scale means on said adjusting means to facilitate the adjustments of said chamfering means along and about said axes.

26. In the chamfering unit of claim 15 means for adjusting said chamfering means along the three major axes and for angularly positioning said chamfering means about one of said axes.

27. In the chamfering unit of claim 26 scale means on said adjusting means to facilitate the adjustments of said chamfering means along and about said axes.

28. In the chamfering unit of claim 15 control means for automatically regulating the operating sequence of said workpiece-centering and clamping means, said chamfering means and said workpiece-indexing means to effect the chamfering of a workpiece means.

29. In combination with a conveyor means for roughed gears which conveyor feeds said gears in intermittent step-by-step fashion, a chamfering unit operatively connected to said conveyor means and including:

workpiece-centering and clamping means for retaining workpiece means during a chamfering operation, said workpiece-clamping means having means for frictionally engaging workpiece means when the workpiece means is clamped between opposed centering means to help prevent rotation;

said workpiece-clamping means further having opposed centering means for retaining workpiece means therebetween and means for varying the pressure exerted on workpiece means by said opposed centering means to allow rotational movement of workpiece means relative to said clamping means during the indexing of workpiece means and to maintain workpiece means in a fixed position during the chamfering of the tooth means of the workpiece means; and including workpiece-indexing means for properly aligning said tooth means of said workpiece means with said chamfering means, said workpiece-indexing means effecting the alignment of said tooth means through the engagement of said tooth means by said indexing means.

30. A chamfering unit in combination with a gear generating machine comprising:

conveyor means of said gear-generating machine for feeding workpieces to be chamfered to said chamfering unit and removing workpieces which have been chamfered from said chamfering unit;

workpiece-centering and clamping means for retaining workpieces in fixed positions when said workpieces are being chamfered, said workpiece-centering and clamping means having opposed centering means for retaining workpiece means therebetween and means for varying the pressure exerted on workpiece means by said opposed centering means to allow rotational movement of workpiece means relative to said centering and clamping means during the indexing of workpiece means and to maintain workpiece means in a fixed position during chamfering of a tooth means of the workpiece means;

chamfering means for chamfering tooth means of workpieces held by said centering and clamping means; and indexing means for properly aligning tooth means with said chamfering means.

31. In the chamfering unit and gear-generating machine of claim 30 means to prevent the advance of said conveyor means during the chamfering of a workpiece.

32. In the chamfering unit of claim 30 said workpiece-indexing means having finger means for engaging said tooth means and drive means for moving said finger means relative to said workpiece means to effect the alignment of said tooth means.

33. In the chamfering unit of claim 30 said workpiece-centering and clamping means having means for frictionally engaging workpiece means when the workpiece means is clamped between said opposed centering means to help prevent rotation.

34. In the chamfering unit of claim 30 means for adjusting said chamfering means along the three major axes and for angularly positioning said chamfering means about one of said axes.

35. In the chamfering unit of claim 34 scale means on said adjusting means to facilitate the adjustments of said chamfering means along and about said axes.

36. In the chamfering unit of claim 30 control means for automatically regulating the operating sequence of said workpiece-centering and clamping means, said chamfering means and said workpiece-indexing means to effect the chamfering of a workpiece means.